Patented Oct. 20, 1936

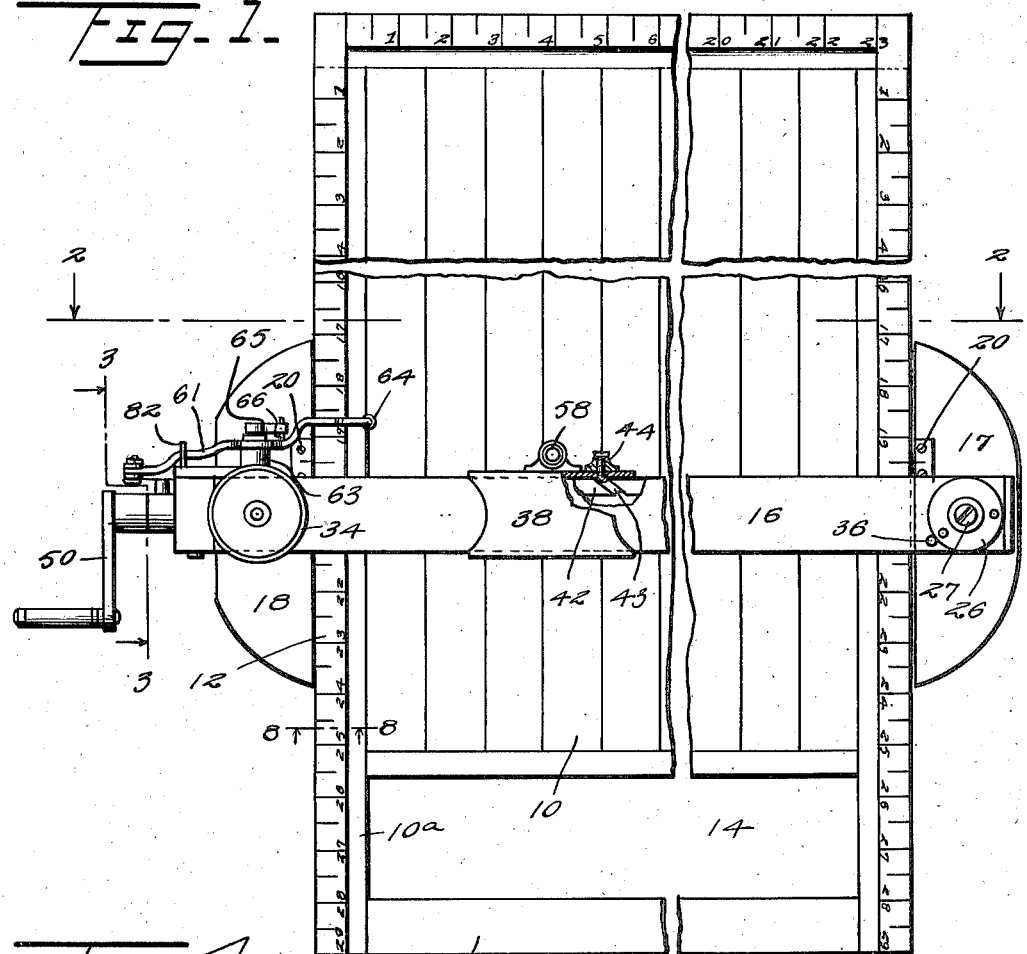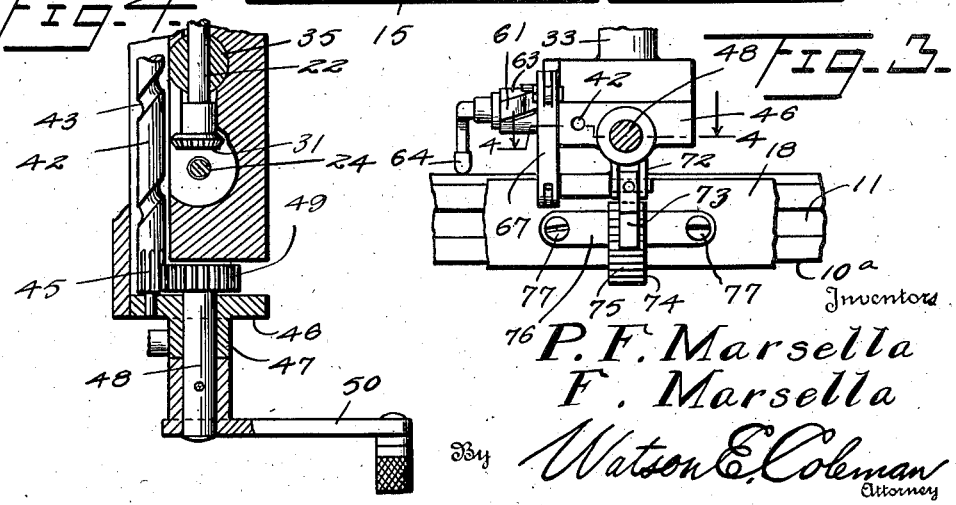

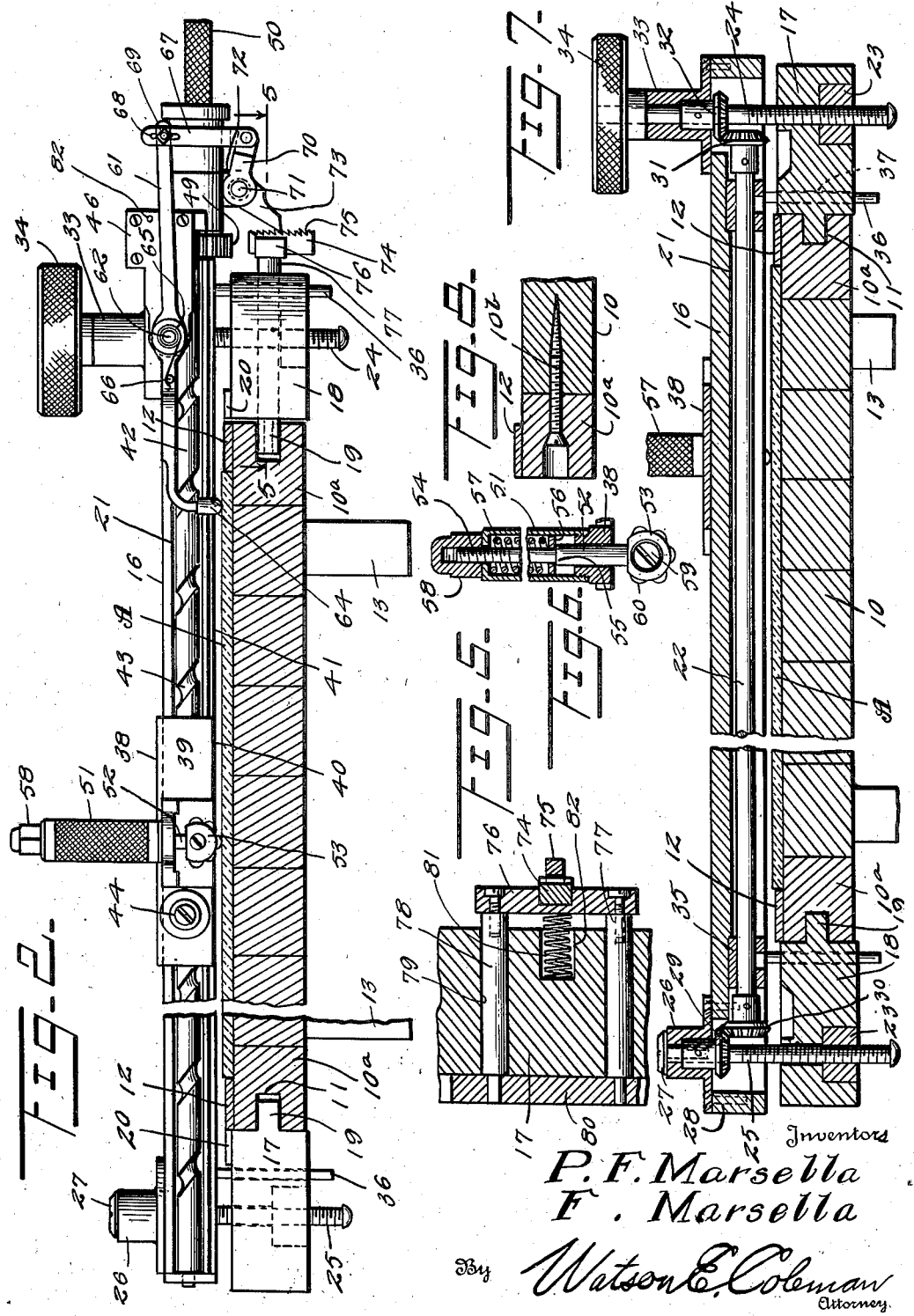

2,058,092

UNITED STATES PATENT OFFICE 2,058,092

GLASS CUTTING APPLIANCE

Philip F. Marsella and Ferdinando Marsella, Seneca Falls, N. Y.

Application June 4, 1935, Serial No. 24,964

13 Claims. (Cl. 33—32)

This invention relates to glass cutting appliances, and particularly to certain improvements upon the glass cutting appliances described and illustrated in our application, Ser. No. 753,984, filed on November 20, 1934.

The general object of the present invention is to provide an attachment which may be readily applied to glass cutting boards or tables, which attachment carries a rule or straight edge with a sliding cutter support thereon and a cutter carried thereby.

A further object in this connection is to provide means whereby the opposite ends of a glass cutting rule or straight edge may be clamped in position upon the table or board so as to hold it from movement while the glass is being cut.

A further object in this connection is to provide means whereby both ends of the glass cutting rule or straight edge may be clamped by the operation of one clamping head at one end of the rule.

A still further object is to provide means for neutralizing, compensating for or preventing the upward bow ordinarily given to the middle portion of a straight edge or rule when it is clamped at its ends against the glass to be cut, by the depression of the cutter against the glass which ordinarily would exert an upward pressure upon the middle portion of the rule.

Still another object of the invention is to provide means whereby the slide which carries the glass cutter may be shifted along the rule or straight edge by means operative from one end of the rule or straight edge so as to eliminate the necessity, on large tables and where large sheets of glass are to be cut, of the operator having to lean over the table or climb upon the table.

Other objects will appear in the course of the following description.

Our invention is illustrated in the accompanying drawings wherein:—

Figure 1 is a top plan view of a glass cutting table having one form of our attachment applied thereto;

Figure 2 is a section on the line 2—2 of Figure 1, with the rule not yet depressed against the glass to be cut;

Figure 3 is a section on the line 3—3 of Figure 1;

Figure 4 is a section on the line 4—4 of Figure 3;

Figure 5 is a fragmentary horizontal section on the line 5—5 of Figure 2;

Figure 6 is a vertical section through the cutter adjusting means;

Figure 7 is a transverse section through a glass cutting table and through a glass cutting rule or straight edge having clamping means for engaging the table;

Figure 8 is a fragmentary section on the line 8—8 of Figure 1.

Referring to Figures 1 and 2, 10 designates a table, which as illustrated, is made up of a plurality of longitudinally extending strips. The actual construction of the table has no relation to our invention. The table is shown as having grooves 11 at its side edges, and strips 12 at its side margins, these strips being shown as having graduations on their upper faces, and the table is illustrated as provided with legs 13. As shown in Figure 1, the lateral sections 10ª of the table, which sections support the graduated strips 12, are extended beyond the body of the table so as to leave an open space 14, the extremities of the sections 10ª being connected by a transverse cross bar 15. This forms a handle whereby the table as a whole may be lifted and carried about. These sections 10ª are held to the sections 10 by screws 10ᵇ (see Figure 8.) The ruled or graduated strips 12, as shown clearly in Figure 2, project up above the surface of the table so as to engage the side edges of a sheet of glass designated A.

Disposed to extend across the table 10 and project beyond the side edges thereof is a straight edge or rule 16 which is hollow and disposed beneath the opposite ends of this rule 16, are T-heads 17 and 18. Both these heads are alike and are shown as somewhat segment-shaped, and each head is provided upon its inside face, as shown in Figure 2, with an inwardly projecting rib 19, which engages within the corresponding groove 11 in the side edge of the table. Thus these heads have sliding engagement with the edges of the table and have portions which engage beneath certain other portions of the table. Each head is provided with an inlaid metallic plate 20 having a graduation mark adapted to be brought in alinement with any desired graduation mark on the scales 12.

Referring now to Figure 7, which shows a simplified form of our mechanism, it will be seen that the rule 16 is channeled or hollowed out, as at 21, for the reception of a longitudinally extending shaft 22. The T-heads 17 and 18 have nuts 23 inset into the lower faces of these heads 17 and 18 and extending upward through these nuts and through apertures in the T-heads are screws 24 and 25. The screw 25 extends upward into a cap 26 and the upper end of the screw has a detachable head 27 having screw threaded engagement with the body of the screw 25 which rests upon the top of the cap 26 and thus supports the screw for rotary movement, the cap 26 being attached to the material of the rule by screws 28. Pinned upon the upper end of the screw 25 is a beveled gear wheel 29 which meshes with the beveled gear wheel 30 mounted upon one end of the shaft 22. The opposite end of this shaft carries a beveled gear wheel 31 which meshes with a beveled gear wheel 32 carried upon the other screw shaft 24. This shaft 24 extends up through the cap 33 and at its upper end carries a knurled hand wheel 34. The shaft 22 is mounted in bearings 35 disposed within the hollow interior of the rule. The rule also carries downwardly extending guide pins 36 which travel through bores 37 formed in the heads 17 and 18. With this construction, it is obvious that as the hand wheel 34 is turned in one direction, the screw will cause the rule 16 to be drawn downward toward the heads 17 and 18, or if the rotation of the screw be reversed to force the rule away from the heads 17 and 18. It will be obvious that as the screw 24 is rotated, the screw 25 will be rotated to the same extent and in the same direction. Now if the rule be brought down upon the sheet of glass A by turning the knurled head 34 and then a little further turn be given to this knurled head, it will be obvious that the rule will be clamped in place at its opposite ends so that it cannot move while the glass is being cut and by alining the graduation marks on the plate 20 with the proper graduation marks on the scales 12, the rule will be held in a position at right angles to the length of the table. The heads 17 and 18 are held from any oscillatory movement upon the screws 24 and 25 by the pins 36 engaging in the apertures 37. Thus the heads are always held at right angles to the rule.

Slidingly mounted upon the rule is a slide 38, as shown in Figure 1, and also shown in Figure 7. This slide has side walls 39 which embrace the side edges of the rule, the lower ends of these side walls having an inwardly turned flange 40 which engages with a groove 41 formed in the lower corners of the rule.

We do not wish to be limited to this construction as obviously the side walls of the slide 38 might be provided with inwardly projecting portions which will engage longitudinally extending grooves or like elements in the side edges of the rule without these grooves being formed at the lower corners of the rule. In the simplest form of our glass cutting mechanism, the slide 38 is capable of being moved by hand along the rule but in the structure shown in Figures 1, 2, 3, and 4, means are provided for shifting this slide along the rule, this means being operable from one end of the rule and preferably from that end of the rule which carries the knurled head 34. To this end, there is disposed within the recess 21 the longitudinally extending screw 42, as shown in Figures 2 and 4, this screw having a relatively wide spiral thread 43 formed therein. The slide 38, as shown in Figure 1, carries a screw pin 44 whose blunt and rounded point engages within the thread 43. Thus as the screw is rotated in one direction or the other, the slide 38 will be shifted in one direction or the other. The screw is mounted in suitable bearings at its ends and one end of the screw is provided with teeth 45, as shown in Figure 4. Mounted upon this end of the rule is an angular plate 46 shown in Figure 2, having a hub 47 constituting a bearing for a short shaft 48 which carries upon it a pinion 49 engaging with the teeth 45. The outer end of this shaft 48 carries upon it a crank handle 50 whereby the shaft may be rotated. It will thus be seen that as the shaft is rotated, the slide 38 which carries the cutter will travel back and forth along the rule. This is particularly designed for use on large tables and for cutting large sheets of glass to do away with the necessity of the operator stretching over the table or getting upon the table in order to properly manipulate the cutter carrying slide along the rule.

While the cutter carrying slide may carry a cutter of any suitable character and which is manually depressible against the surface of the glass, we preferably provide the slide 38 with the upwardly extending hollow casing 51, as shown in Figure 6, which is closed at its upper end. Extending upward into this casing is the stem 52 of a cutter head 53. This stem at its upper end is reduced and screw threaded, as at 54, and the shoulder 55 bears against a plate or washer 56 disposed loosely within the casing 51. Disposed between the upper closed end of the casing and this washer 56 is a coiled compression spring 57. Resting upon the top of the casing is a cap nut 58 engaging the screw threads of the stem and it will be obvious now that as the cap nut is turned in one direction, the stem will be lifted against the action of the spring 57 and that when turned in the opposite direction, it will permit the spring to force the stem downward. The stem preferably carries upon its lower end the head 53 detachably engaged with the lower end of the stem by the screw 59, this head 53 carrying a plurality of glass cutters 60. This particular form of head containing a plurality of rotatable cutters 60 is fully illustrated and described in our pending application for patent. By releasing the screw 53, the back plate which carries the cutters 60 can be rotated to bring any one of the cutters into position projecting below the lower end of the head. Then the screw is tightened to hold the cutter in this position. This particular construction forms no part of our present invention, and it is to be understood that a single cutter might be mounted upon the lower end of the head and that this cutter might be either a diamond or a steel wheel or any other form of glass cutter. With the construction illustrated in Figure 6, however, by rotating the cap nut 58, the cutter 60 may be lifted from the glass or be permitted to be depressed on the glass by the spring 57. When the rule has been adjusted to its proper position with the slide retracted to its proper position, then the cap 58 is rotated to permit the spring 57 to force the cutter down against the glass and when the cutter is in proper position and urged down with the proper force, the crank 50 is then rotated to cause the slide 38 to shift across the face of the rule carrying the cutter, as shown in Figure 2, across the surface of the glass.

For the purpose of preventing the middle portion of the rule or straight edge from bowing upward when the rule is clamped downward against a sheet of glass, we provide a lever 61 (see Figures 1 and 2), this lever being pivotally mounted between its ends on a pin 62 projecting laterally from a hub 63. Inward of this hub 63, the lever 61 is angularly bent, then extended inward, as shown clearly in Figure 1, and the inner end of this lever carries upon it the rounded head 64 which bears immediately upon the surface of the glass. This head may be made of hard or soft rubber or any other suitable material but is so designed as not to scratch or mar the glass. Surrounding the pin 61 is the coil of a spring 65 which is attached to the pin at its inner end and at its outer end extends parallel to the inner arm of the lever and is engaged over a pin 66 carried by the lever. This spring, therefore, urges the inner end of the lever downward against the glass. The outer end of the lever extends beyond the angular bracket or plate 46, as shown in Figure 2, and has pivoted to it a link 67, this link being forked at its upper and lower ends and being longitudinally slotted at its upper end, as at 68. The outer end of the lever is pivotally connected to this link by a bolt 69 passing through the slot 68. The lower end of this link 67 is connected to an arm 70 mounted upon a short transverse shaft 71. This shaft is supported by a fork 72 projecting downwardly from the hub 47. Mounted upon this shaft is a downwardly and inwardly directed dog 73. Coacting with this dog is a head 74 having upwardly extending ratchet teeth 75 on its outer face with which the dog is adapted to coact. This head 74 has transversely extending arms 76, as shown in Figure 5. These arms at their ends carry screws 77. These screws enter guide rods 78 which operate through bores 79 formed in the T-head 17, and mounted upon the extremities of these arms is a plate 80 which normally fits within a recess formed in the tongue 19 of the head 18. A spring 81 having its inner end disposed in a recess 82 formed in the outer face of the head 17 bears against the head formed of the parts 74 and 76 and urges this head outward, as shown in Figure 5. When the knurled head 34 is rotated to force the rule down against the face of the glass to be cut, the surface of the glass as the rule moves downward will come in contact with the sheathed end 64 of the lever 61. As the rule is still further shifted downward, the fulcrum of the lever 61 descends, causing the outer end of the lever to be depressed, forcing the dog 73 inward against the ratchet teeth. Then as the knurled head 34 is still further rotated to force the rule down against the glass, the dog will be forced inward against the ratchet teeth of head 74, because the pawl cannot move downward on account of its engagement with the ratchet teeth, and the head 74 will be forced inward against the action of the spring 81. As the rule 16 is raised by the rotation of the head 34, the dog 73 will ride over the faces of the ratchet teeth. As soon as the rule has been lifted sufficiently for the sheathed extremity 64 to leave the glass, then the spring 65 will lift the rear end of the lever 61 and shift the dog out of engagement with the ratchet teeth 75. A stop pin 82 limits the upward movement of the outer end of the lever.

The lever 61 and allied parts is a particularly important part of our invention where the straight edge has a considerable length and is intended for cutting very wide sheets of glass up, for instance, to 8 feet, such as glass for plate glass windows, and where the cutter is moved across the face of the glass by means of the crank 50, as heretofore described. At the ends of the straight edge, the straight edge is held downward by the screws 24 and 25, so that it cannot lift and when the slide 38 is disposed closely adjacent to the knob 34, the cutter exerts a pressure on the glass proportionate to the pressure exerted by the spring 57 as adjusted by the nut 58, but as the slide moves further toward the middle of the rule and away from the knob 34, the action of the spring 57 will be not only downward to force the cutter towards the glass but upward with a tendency to bow the rule so that the spring will exert less pressure on the cutter in the middle of the rule than at the ends. To prevent this upward bowing of the rule and secure an even pressure on the cutter at all times, we find it absolutely necessary to provide the lever 61 with its contact member 64 bearing against the glass and the allied parts heretofore described. Actual practice has shown that without this lever 61 and allied parts, the cutter does not work satisfactorily on that form of the mechanism shown in Figure 2. Assuming that the glass to be cut extends three-quarters of the width of the table from rule 12 on that side of the table adjacent the knob 34 and that the said glass is one-quarter of an inch thick and that the lever 61 is removed from the machine; then in order to operate the mechanism, the knob 34 is turned and as the knob 34 is turned and as the knob 34 is tightened so as to clamp the rule firmly down upon the glass, it will be seen that at the other side of the table and beyond the glass, the straight edge or rule will bend downward. If then now the parts are loosened and the same piece of glass is shifted to the other side of the table and the knob 34 again turned, then the rule will bend down more on the end close to the knob 34 than at the other end. Under these circumstances, and without the lever 61, the cutter will not cut the glass evenly, because the spring of the cutter will press the middle portion of the straight edge or rule upward. Now, however, if the lever 61 is used and this lever is adjusted by means of the slot 68 and nut 69 so that the extremity 64 of the lever is disposed a little lower than the underface of the straight edge, then when the knob 34 is rotated to shift the rule downward against the glass, as soon as the extremity 64 touches the surface of the glass, the dog 73 will bear against and attempt to force in the cross bar 76 against the action of the spring 81.

It is to be understood that in the structure shown in Figure 7, no lever 61 is necessary because in this structure it is presumed that the cutter is for glass of small width and that the operator can reach over the table or bed and force the cutter downward by hand, and that inasmuch as he forces the cutter down by hand, it does not matter whether the middle portion of the rule bows upward or not, but on the relatively wide table shown in Figure 2 which is so wide that the cutter cannot be manually pushed down but must be forced down by adjustment or by a spring, it is necessary to provide some means for counteracting or eliminating the bow which would otherwise be given to the straight edge and that this is secured by means of the lever 61 and allied parts, as before described.

The operation of this mechanism will be obvious from what has gone before, but it is pointed out that Figure 7 represents a rule provided with means whereby it may be clamped in adjusted position upon the table by operating the head 34, and that the rule shown in Figure 7 may be used with any desired form of cutter mounted upon the slide 38 and that this slide may be manually shifted across the face of the glass by taking hold of the upwardly projecting portion 57. The remaining figures, however, show a rule which is not only provided with the clamping means shown in Figure 7, but with a screw threaded shaft whereby the slide 38 may be shifted across the face of the glass by manipulating the crank handle 50, this particular rule being also provided with the clamping means. It is to be understood that the rule shown in Figure 7 or the rule shown in Figure 2 may be both used on the same or in connection with the same table or glass supporting bed or that either one of these rules may be used in connection with the table.

While where a complete glass cutting outfit is provided, the table will be formed initially with the grooved lateral sections 10ª, yet it is within our invention to provide these lateral sections 10ª as an attachment to be applied to an ordinary table 10 and held thereto by the screws 10ᵇ, as shown in Figure 8. It is also within the purview of our invention to provide a glass cutting appliance carried upon the slide 38 in which the spindle is depressible by hand, as shown in our prior application, Ser. No. 753,984, hereinbefore referred to, and that it is only where a relatively large table is used for cutting relatively large sheets of glass that the slide traversing shaft 42 is used.

While we have illustrated certain details of construction and arrangement of parts, yet we do not wish to be limited thereto as obviously many changes might be made in these details without departing from the spirit of the invention as defined in the appended claims.

What is claimed is:—

1. A glass cutting mechanism including a rule adapted to be disposed across a glass cutting table and above the surface of the glass to be cut, table clamping means disposed at opposite ends of the rule for forcing the rule toward the table and against the glass to be cut, and means operated from one end of the rule for operating both of said table clamping means simultaneously.

2. A glass cutting mechanism including a table having graduations on each margin, a rule movable at its opposite ends over said graduations, T-heads located beneath the opposite ends of the rule and having portions adapted to engage beneath portions of the table, screws extending through the opposite ends of the rule and into said heads whereby the heads may be drawn toward the rule to clamp the opposite ends of the rule in adjusted position on the table, and single means disposed at one end of the rule for simultaneously operating both of said screws in the same direction.

3. A glass cutting mechanism including a rule, T-heads at opposite ends of the rule, the inner faces of the T-heads being grooved, the upper faces of the heads having index marks, screws extending through the ends of the rule and into said heads whereby the heads may be drawn toward the rule or shifted away from the rule, and single means disposed at one end of the rule for simultaneously elevating or depressing both of said heads relative to the rule.

4. A glass cutting mechanism including a rule, T-heads located beneath the opposite ends of the rule, the T-heads having portions adapted to engage beneath portions of a table, screws swivelled in the ends of the rule and having screw threaded engagement with the heads whereby the heads may be drawn toward the rule to clamp the rule at its opposite ends upon a table, each of said screws having a beveled gear wheel, and a shaft mounted within the rule and extending longitudinally thereof, the shaft having beveled gear wheels engaging the beveled gear wheels on the screws, one of said screws having a head whereby the screw may be rotated.

5. A glass cutting machine including a rule adapted to be disposed across a glass cutting table, and upon a sheet of glass carried thereby, means for forcing the rule toward the table and against the glass to be cut, a cutter carrying slide on the rule, and means operable from one end of the rule for shifting the slide along the rule, including a screw extending longitudinally through the rule and having screw threaded engagement with the slide.

6. A glass cutting rule having a longitudinally extending recess, a screw threaded member disposed in said recess and extending longitudinally of the rule, means at one end for rotating said screw threaded member, a slide embracing the rule and having engagement with the threads of the shaft, and a depressible glass cutter carried by the slide.

7. A glass cutting rule having a longitudinally extending recess, a screw threaded member disposed in said recess and extending longitudinally of the rule, means at one end for rotating said screw threaded member, a slide embracing the rule and having engagement with the threads of the shaft, a glass cutter having a stem, a tubular casing into which the stem extends, a spring within the casing urging the stem downward, and a nut engaging the stem whereby the stem may be lifted against the action of said spring.

8. In a glass cutting mechanism, a rule, a slide embracing the rule and slidable therealong, the slide having an upwardly extending tubular casing closed at its upper end, a glass cutting head having a stem extending upward through the casing, a spring within the casing urging the stem downward, and a nut engaging against the top of the casing and with the stem whereby the stem may be raised.

9. In a glass cutting mechanism, a rule, a table over which the rule operates, means operatively engaging the table and the ends of the rule whereby the rule may be forced down toward the glass on the table and clamped in position, and means for preventing the rule from bowing upward at its middle, including a lever adapted to bear against the glass beneath the rule, the lever being carried by the rule, and means bearing against the edge of the table for resiliently urging the glass engaging end of the lever against the glass as the clamping means is operated.

10. In a glass cutting mechanism, a table having graduated scales on its side margins and having grooves in its side edges, T-heads having ribs slidingly engaging said grooves, a rule extending across the table, screws swivelled in the ends of the rule and having threaded engagement with the heads, a lever pivotally supported upon the side edge of the rule adjacent one end and having its inner extremity turned downward to engage against the glass on the table, and means yieldingly bearing against the adjacent edge of the table acting as the screw at this end is turned upward to yieldingly resist the downward movement of the outer end of the lever.

11. In a glass cutting mechanism, a table having graduated scales on its side margins and having grooves in its side edges, T-heads having ribs slidingly engaging said grooves, a rule extending across the table, screws swivelled in the ends of the rule and having threaded engagement with the heads, a lever pivotally supported upon the side edge of the rule adjacent one end and having its inner extremity turned downward to engage against the glass on the table, a shaft supported below this end of the rule and extending transversely thereof, the shaft having an arm, a link between the arm and the outer end of the lever, a dog carried upon the shaft, a ratchet-faced plate mounted in the outer face of the adjacent head for sliding movement parallel to the rule and with the ratchet teeth of which the dog engages and against which the dog presses as the outer end of the lever tends to move downward upon a downward movement of the rule, and spring means bearing against the edge of the table resisting the inward movement of the ratchet toothed plate towards the head.

12. A glass cutting mechanism including a table having grooves on its side edges, T-heads having ribs slidingly engaging said grooves, a rule extending across the table, screws swivelled in the ends of the rule and having threaded engagement with the heads whereby the rule may be forced down against the glass to be cut, a slide slidingly mounted upon the rule, a spring depressed cutter carried upon said slide, means for adjusting the pressure of the spring, means carried by one of said heads and engaging the slide to shift it across the rule upon the manual operation of said means, and means yieldingly resisting upward bowing of the rule as the slide moves away from the extremities of the rule.

13. A glass cutting mechanism including laterally disposed table sections having screws whereby they may be attached to the side edges of a table, said table sections having longitudinally extending grooves upon their outer faces, opposed heads having tongues engaging in said grooves, a rule having its ends extending over the heads, screws swivelled in the rule and having threaded engagement with the heads, means for operating both of said screws simultaneously to thereby raise or lower the rule with reference to the heads, and a cutter carrying slide mounted upon the rule.

PHILIP F. MARSELLA.
FERDINANDO MARSELLA.